United States Patent [19]
Gochi

[11] Patent Number: 5,797,024
[45] Date of Patent: Aug. 18, 1998

[54] PC CARD

[75] Inventor: Hidenobu Gochi, Tokyo, Japan

[73] Assignee: Mitsubishi Denki Kabushiki Kaisha, Tokyo, Japan

[21] Appl. No.: 558,869

[22] Filed: Nov. 16, 1995

[30] Foreign Application Priority Data

Nov. 25, 1994 [JP] Japan ................... 6-291478

[51] Int. Cl.$^6$ ................................ G06F 1/30
[52] U.S. Cl. ........................ 395/750.08; 365/229
[58] Field of Search .................. 395/750, 282, 395/750.1, 750.08, 229; 365/222, 229, 227

[56] References Cited

U.S. PATENT DOCUMENTS

| | | | |
|---|---|---|---|
| 4,313,180 | 1/1982 | Mochizuki et al. | 365/222 |
| 4,587,640 | 5/1986 | Saitōh | 365/229 |
| 5,272,677 | 12/1993 | Yammura | 365/227 |
| 5,442,277 | 8/1995 | Mori et al. | 323/312 |

FOREIGN PATENT DOCUMENTS

| | | |
|---|---|---|
| 256619 | 2/1990 | Japan. |
| 4153995 | 5/1992 | Japan. |
| 4174378 | 6/1992 | Japan. |

*Primary Examiner*—Ayaz R. Sheikh
*Assistant Examiner*—David A. Wiley
*Attorney, Agent, or Firm*—Leydig, Voit & Mayer, Ltd.

[57] ABSTRACT

A PC card wherein a voltage supplied by an auxiliary battery is confirmable from an external device in a state in which an interface is maintained. A selection signal from an address decode circuit changes to a significant condition when a given address in an unused memory area is accessed in accordance with an address signal, with the result that a MOSFET transistor turns on so that the auxiliary battery makes contact with a voltage detector to detect the voltage of the auxiliary battery. The detection result is temporarily stored in a register and output as a portion of data to the external device at the time that a register output enable signal changes to a significant condition by an output enable signal.

3 Claims, 5 Drawing Sheets

PC CARD

BACKGROUND OF THE INVENTION

1. Field of the Invention

The present invention relates to a PC card equipped with a volatile semiconductor storage element serving as a data storing memory, a main battery for supplying power to the volatile semiconductor storage element, and an auxiliary battery for supporting the main battery, and more particularly to detection of battery voltages of a PC card.

2. Description of the Prior Art

FIG. 5 is an illustration of an internal arrangement of a known PC card. In the illustration, the known PC card, designated at numeral 100, comprises a main battery 1, a reverse current control resistor 2, a reverse current preventing diode 3, an auxiliary battery 4, a mechanical switch 5 configured to be in a closed state in response to removal of the main battery 1, a reverse current control resistor 6, and a reverse current preventing diode 7. Further, included in the PC card 100 are a power supply switching/battery voltage detecting circuit 8 for carrying out the switching between an external power supply 11, which will be described later, and the main battery 1 and for performing the detection of the voltage of the main battery 1, battery voltage output terminals 9, 10 for outputting the voltage of the main battery 1, an external power supply 11 for supplying power when the PC card 100 comes into connection with external devices such as a reader and a writer, and an internal power supply 12 connected with internal circuits (for example, a data storage element 13a and the like). Additionally, the PC card 100 includes a data storage element 13a comprising a volatile semiconductor storage element to store the ordinary data, and an attribute information storage element 13b comprising of a non-volatile semiconductor storage element to store the attribute information on this PC card 100. In general, a plurality of data storage elements 13a are provided within a PC card.

Moreover, in the PC card 100, there are provided an address decode circuit 14, an attribute information memory space selection signal conductor (line) 15, an address bus 16, an output enable signal conductor for allowing data to be read out from the storage elements 13a, 13b, selection signal conductors 18a, 18b for selecting (making operable) the data storage element 13a and the attribute information storage element 13b, respectively, and a data bus 27. Only when the attribute information memory space selection signal conductor 15 is in a significant condition (for example, a L level in a negative logic circuit), the address decode circuit 14 selects the attribute information storage element 13b. The attribute information memory space selection signal conductor 15 may be set to the most significant address of the address bus 16. In a case where a plurality of data storage elements 13a are used therein, the same number of selection signal conductors 18a are provided accordingly, and one of them becomes significant in accordance with the host address of the address bus 16. The battery voltage output terminals 9, 10, the external power supply 11, the attribute information memory space selection signal conductor 15, the address bus 16, the output enable signal conductor 17, the data bus 27 and GND are coupled through connectors (not shown) to the external device.

Secondly, the operation of the PC card 100 in FIG. 5 being a negative logic circuit will be described below. The description will particularly be made about the power supply system. Assuming that the card 100 comes into connection with the external device and, hence, the external power supply 11 has a voltage exceeding a predetermined value, the power supply switching/battery voltage detecting circuit 8 causes the switching from the main battery 1 to the external power supply 11 so that the card internal circuits start to receive the power from the external power supply 11. On the other hand, when the card 100 separates from the external device and, hence, the voltage of the external power supply 11 falls below a predetermined value, the power source is switched from the external power supply 11 to the main battery 1 so that the internal circuits of the card 100 rely on the power supply from the main battery 1.

The diodes 3, 7 prevent the reverse flows of the currents from the external power supply 11 to the main battery 1 and the auxiliary battery 4 respectively, and the resistors 2, 6 control the reverse currents in case that the diodes 3, 7 are short-circuited. In addition, the mechanical switch 5, is designed to take the open state, for example, when the main battery 1 is mounted on the card 100, and is designed to come into the closed state in response to the removal of the main battery 1 from the card 100. This mechanical switch 5 enables the data of the data storage element 13a to be maintained by the auxiliary battery 4 in replacement of the main battery 1. Moreover, the main battery voltage detecting terminals 9, 10 detect the voltage of the main battery 1 to output H levels, respectively, when the voltage of the main battery 1 exceeds 2.6V, for example. On the other side, when the voltage of the main battery is in the range of 2.6V to 2.4V, the terminal 9 outputs the L level, while the terminal 10 outputs the H level. In addition, when being below 2.4V, both the terminals 9, 10 output the L levels, respectively.

There is a problem which arises with the known PC card, however, in that difficulty is encountered in measuring the voltage of the auxiliary battery. Accordingly, it is difficult to absolutely determine whether or not the auxiliary battery can hold the data if the main battery is not able to provide power.

SUMMARY OF THE INVENTION

It is therefore an object of the present invention to provide a PC card which permits the voltage of the auxiliary battery to be monitored externally in a state in which an interface is maintained.

According to one aspect of the present invention, there is provided a PC card comprising a main battery for supplying power to a volatile memory to maintain the data therein and an auxiliary battery for replacing the main battery when the main battery is in a non operating state, the PC card being capable of accomplishing the detection of the voltage of the auxiliary battery when accessing a specific address in an unused memory area (a memory area which is not ordinarily accessed). That is, the auxiliary battery makes contact with battery voltage detecting means to detect the battery voltage in accessing a given address in an unused memory area.

In accordance with another aspect of the present invention, a PC card comprises memory means including a volatile semiconductor storage element to store data, address decode means for making a corresponding area of the memory means accessible in accordance with an address signal, a main battery for maintaining the data of the memory means, an auxiliary battery for replacing the main battery when the main battery is unable to supply power, an auxiliary battery voltage detecting means for detecting a voltage of the auxiliary battery, switch means driven by the address decode means in response to a given address in an unused memory area being accessed in accordance with the address signal so that the auxiliary battery makes connection with the auxiliary battery voltage detecting means, and register means for temporarily storing a detection result of the auxiliary battery voltage detecting means and for subsequently outputting it as a portion of data to the external device.

With this arrangement, the switch means is driven by a signal from the address decode means when the given address in the unused memory is accessed in accordance with the address signal, with the result that the auxiliary battery is connected with the auxiliary battery voltage detecting means, which detects the battery voltage. The detection result is temporarily stored in the register means and output as a portion of the data to the external device.

In accordance with a further aspect of the present invention, a PC card comprises memory means including a volatile semiconductor storage element to store data, address decode means for making a corresponding area of the memory means accessible in accordance with an address signal, a main battery for maintaining the data in the memory means, an auxiliary battery for replacing for the main battery when the main battery is unable to supply power, battery voltage detecting means for detecting the voltages of the main battery and the auxiliary battery to output the detection results to the external device, and switch means ordinarily made to connect the main battery to the battery voltage detecting means and driven by the address decode means in response to accessing a given address in an unused memory area so that, in place of the main battery, the auxiliary battery comes into connection with the battery voltage detecting means.

This arrangement is particularly well for also detecting the voltage of the auxiliary battery by the battery voltage detecting means which originally detects the voltage of the main battery and outputs the detection result to the external device. The main battery is ordinarily in connection with the battery voltage detecting means, while the switch means is driven by the signal from the address decode means when the given address in the unused memory area is accessed in accordance with the address signal. Accordingly, the auxiliary battery, in place of the main battery, makes into connection with the battery voltage detecting means for the detection of the auxiliary battery voltage.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF PREFERRED EMBODIMENTS

First Embodiment

Figure 1:
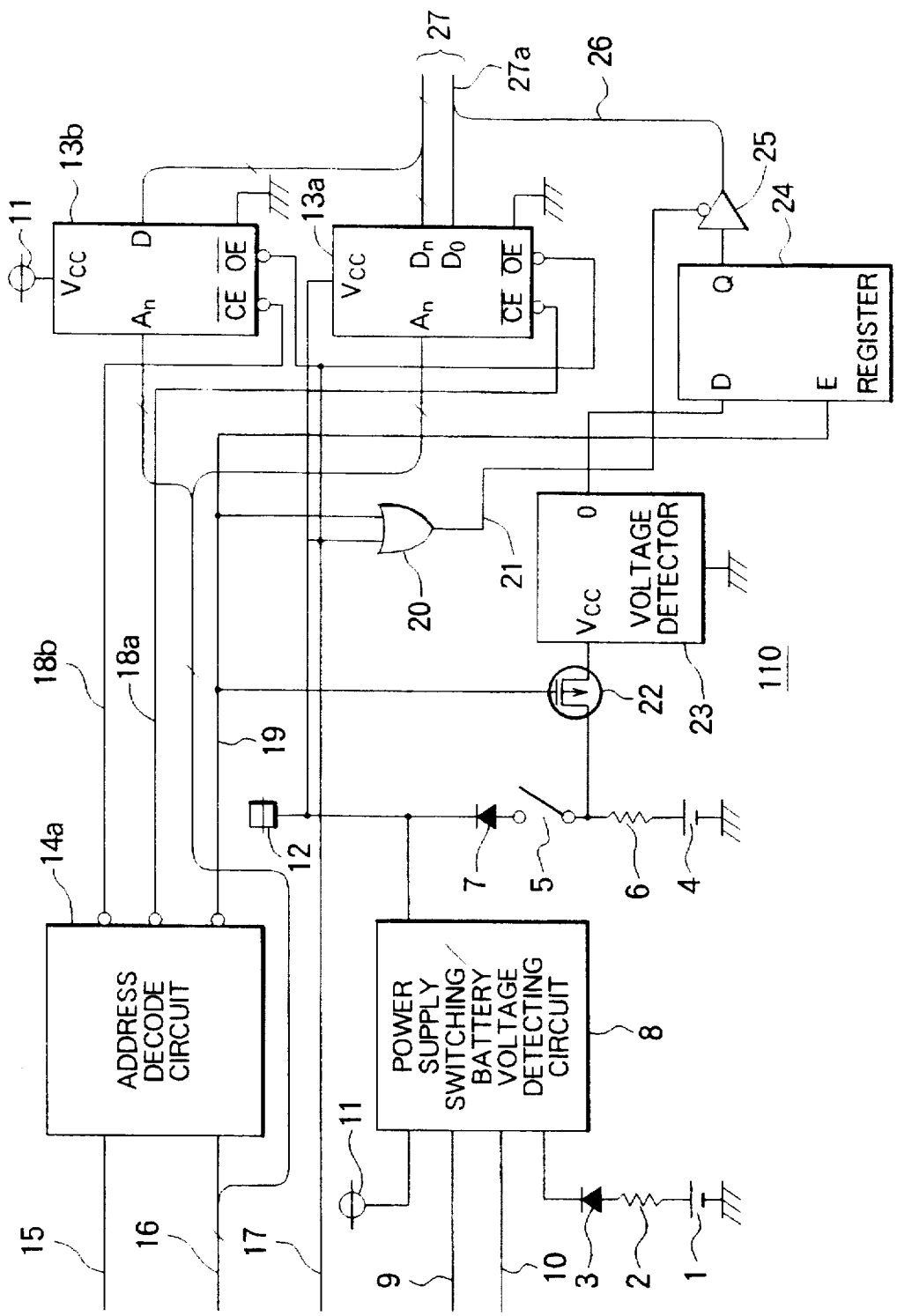
FIG. 1 is a block diagram showing an internal arrangement of a PC card according to a first embodiment of the present invention.

A description is made with reference to FIG. 1 in terms of a PC card according to a first embodiment of the present invention. In the illustration, the PC card, designated by reference numeral 110, is equipped with a main battery 1, a reverse current control resistor 2, a reverse current preventing diode 3, an auxiliary battery 4, a mechanical switch 5 made to come into the closed state, a reverse current control resistor 6, and a reverse current preventing diode 7. Also included in the PC card 110 are a power supply switching/battery voltage detecting circuit 8 for performing the switching between an external power supply 11 and the main battery 1 and further for detecting the voltage of the main battery 1, battery voltage output terminals 9, 10 for outputting the voltage of the main battery 1, an external power supply 11 for supplying power when the PC card 110 is connected with an external device such as a reader and a writer, and an internal power supply 12 coupled to an internal circuit (for example, a data storage element 13a or the like) of the PC card 110. Further, the PC card 110 comprises a data storage element 13a such as a volatile semiconductor storage element for storing the ordinary data, and an attribute information storage element 13b such as a non-volatile semiconductor storage element for storing the attribute information of this PC card 110. In FIG. 1, only one data storage element 13a is illustrated for simplicity.

Additionally, the PC card 110 comprises an address decode circuit 14a, an attribute information memory space selection signal conductor 15, an address bus 16, an output enable signal conductor 17 for allowing data to be read out from the storage elements 13a, 13b, selection signal conductors 18a, 18b for selecting the data storage element 13a and the attribute information storage element 13b, respectively, and a selection signal conductor 19 for selecting a register 24 for detection of the auxiliary battery voltage. Only when the attribute information memory space selection signal conductor 15 is in a significant condition (for example, a L level in a negative logic circuit), the address decode circuit 14a selects the attribute information storage element 13b. Alternatively, when the attribute information memory space selection signal conductor 15 is in a significant condition and a predetermined address signal is input to the address bus 16, the selection signal conductor 19 selects the register 24. The attribute information memory space selection signal conductor 15 can be set to the most significant address of the address bus 16. In addition, if a plurality of data storage elements 13a are provided, the number of selection signal conductors 18a increases accordingly, one of which becomes the significant condition in accordance with the host address of the address bus 16.

The PC card 110 also comprises a register output enable signal producing circuit 20 for the register 24, and a register output enable signal conductor 21. The register output enable signal producing circuit 20 comprises an OR circuit receiving a selection signal 19 and an output enable signal 17, its output, i.e., a resistor output enable signal (21) being coupled to a tri-state buffer 25 which in turn, is connected to the output side of the register 24.

In the PC card 110 reference, numeral 22 represents a P-channel MOSFET transistor which turns on when the selection signal 19 is in the L level, and reference numeral 23 denotes a voltage detector for detecting whether or not the voltage of the auxiliary battery 4 is above 2.5V, for example. The voltage detector 23 comprises a comparator (similar to 31, 21 in FIG. 4) which implement a comparison between the voltage (for example, 2.5V) of a reference power supply and the voltage of the auxiliary battery 4. As mentioned above reference, numeral 24 depicts a register, and numeral 25 represents a tri-state buffer. Further reference, numeral 27 designates a data bus, and reference numeral 26 represents an output signal conductor for sending the output of the register 24 through one data line 27a ($D_O$) of the data bus 27. The battery voltage output terminals 9, 10, the external power supply 11, the attribute information memory space selection signal conductor 15, the address bus 16, the output enable signal conductor 17, the data bus 27 and GND are coupled through connectors (not shown) to the external device.

Figure 2:
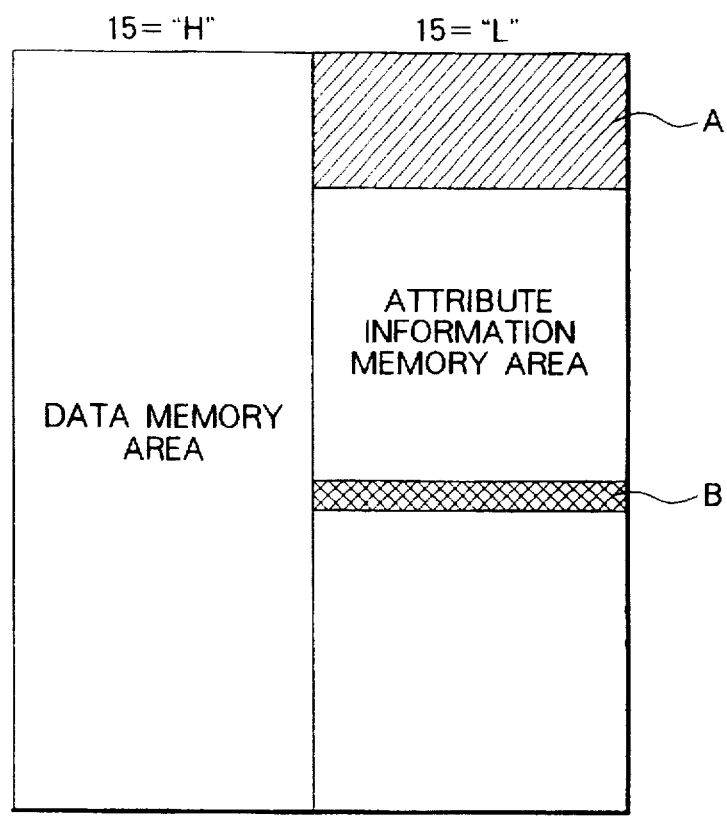
FIG. 2 is an illustration of a memory map of the PC card of FIG. 1.

FIG. 2 is an illustration of a memory map of the PC card 110 of FIG. 1. The left-hand side of FIG. 2 shows a data memory area being an area of the data storage element 13a to be selected when the attribute information memory space selection signal conductor 11 is in the H level (in the case of a negative logic circuit), while the right-hand side of FIG. 2 indicates an attribute information memory area being an area of the attribute information storage element 13b to be selected when the selection signal conductor 15 is in the H level. In the right-hand side, a section A is an area storing the attribute information of the attribute information memory area, and a section B is an unused considerably high order area used in the detection of the voltage of the auxiliary battery 4.

The data storage element 13a and the attribute information storage element 13b make up the memory means, the address decode circuit 14a comprises the address decode means, the voltage detector 23 comprises the auxiliary battery voltage detecting means, the MOSFET transistor 22 serves as the switch means, and the register 24, the register output enable signal producing circuit 20 and the tri-state buffer 25 act as the register means.

Figure 5:
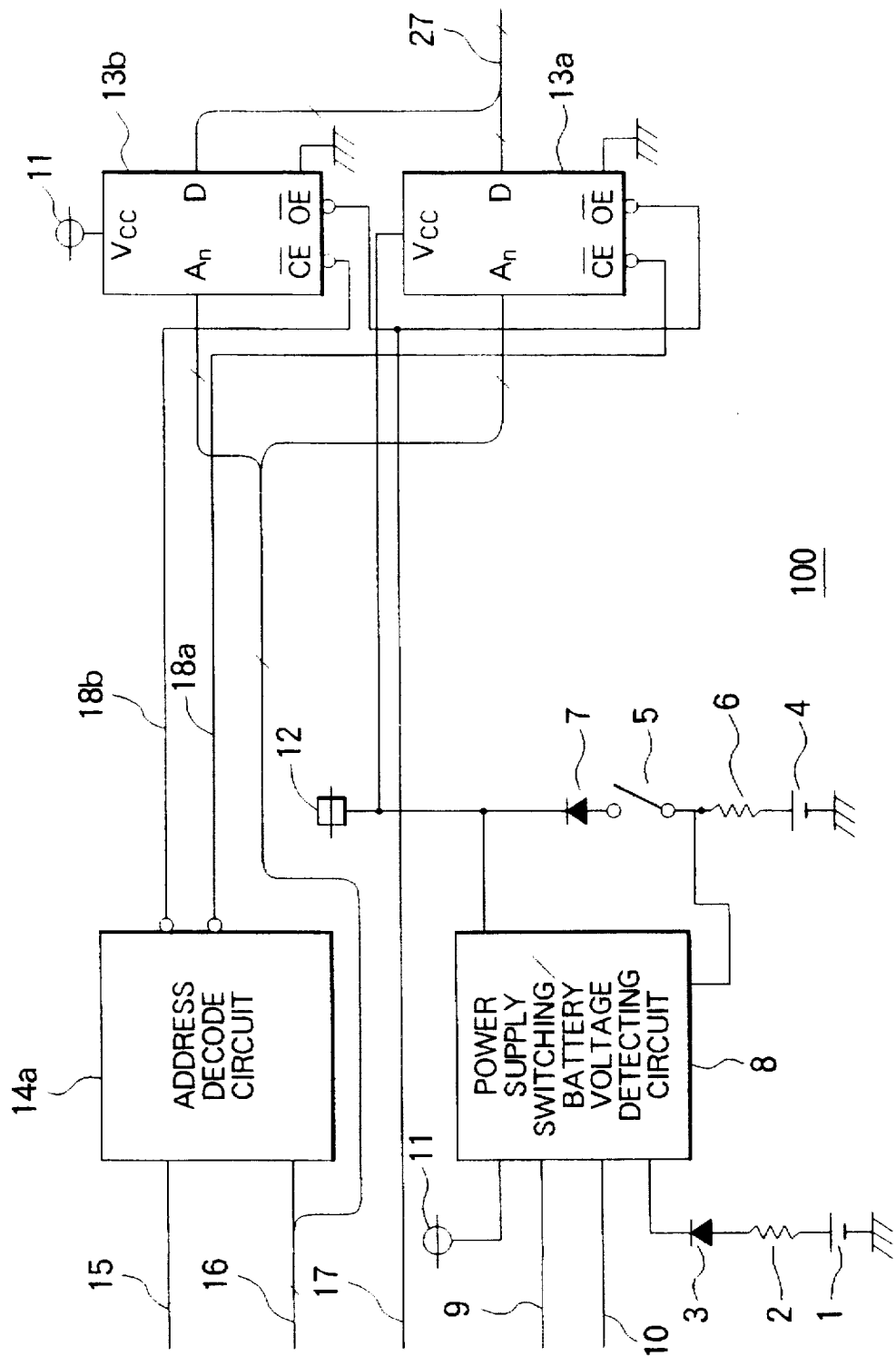
FIG. 5 shows an internal arrangement of a known PC card.

Secondly, the operation of the PC card 110 is as follows. The circuit of FIG. 1 is also configured as a negative logic circuit, and the basic operation thereof is the same as the known circuit of FIG. 5 described above. For this reason, the description about the same or corresponding portions, will be omitted. However, a detailed description of the voltage detecting operation of the auxiliary battery 4 will be made.

If the attribute information memory space selection signal 15 change to into the L level state and a given high-order address, being in the attribute information memory area as shown by the area B in FIG. 2 and being not ordinarily accessed, is specified through the address bus 16, then the address decode circuit 14a changes the selection signal 19 to the L level and the P-channel MOSFET transistor 22 is turned on. The use of the MOSFET transistor is for the purpose of permitting current flow only at the access time so as to provide maximum reduction of the consumption of the auxiliary batter 4. Thus, the auxiliary battery 4 is connected with the 2.5V voltage detector 23 which in turn, outputs the H level when the voltage of the auxiliary battery 4 exceeds 2.5V and outputs the L level when the output is below 2.5V. This content is input through the selection signal 19 in the register 24 and temporarily stored therein. In this state, if the output enable signal 17 changes to the L level, both the selection signal 19 and the output enable signal 17 become the L level, with the result that the register output enable signal 21 of the register output enable signal producing circuit 20 changes to the L level. Thus, the tri-state buffer 25 is turned on, and the voltage state of the auxiliary battery 4 is read out, as data, through the output signal conductor 26 and one data line 27a of the data bus 27 to the external of the card 110. This allows the voltage state of the auxiliary battery 4 to be checked at the outside of the card 110.

Second Embodiment

Figure 3:
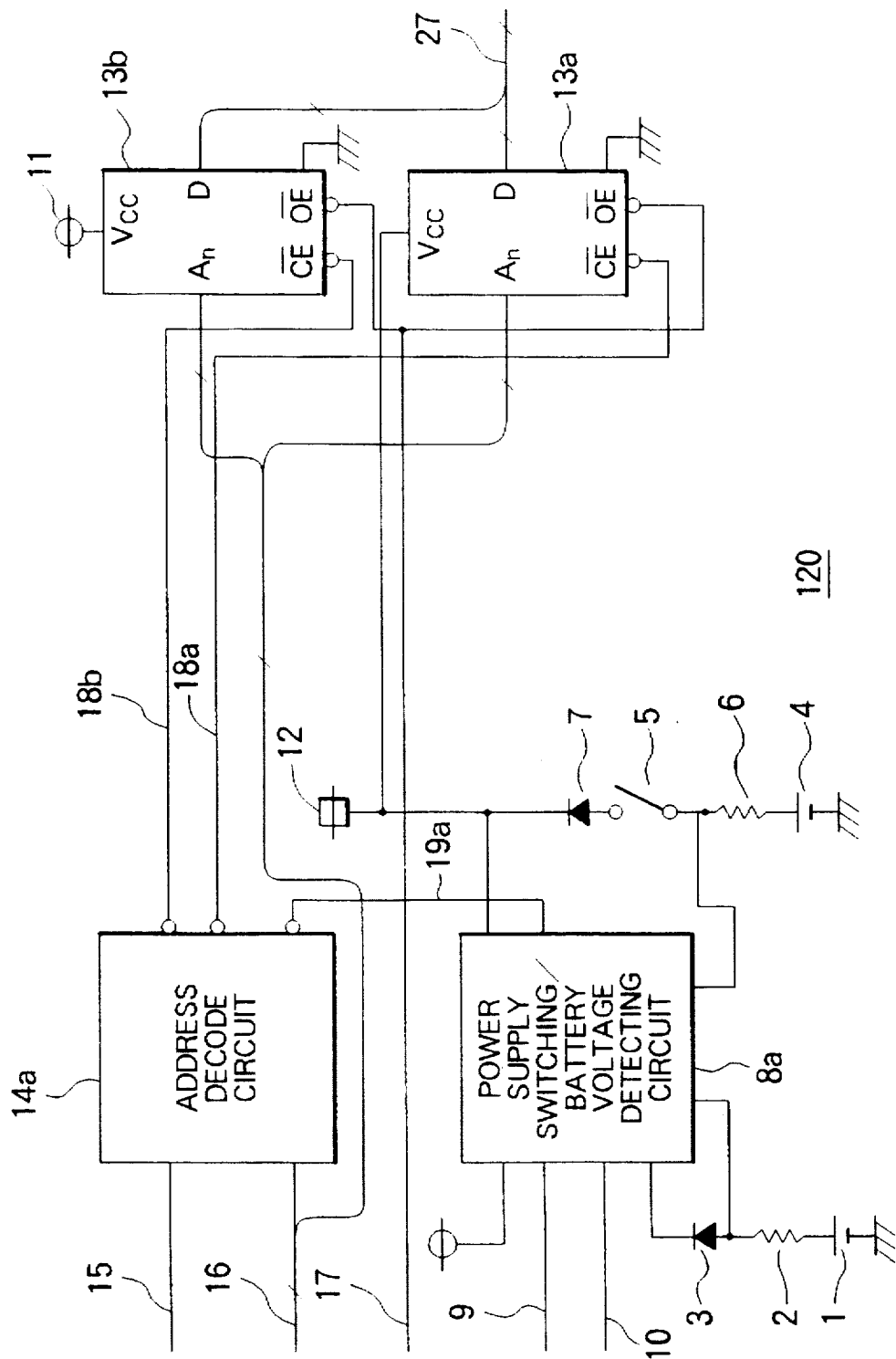
FIG. 3 is a block diagram showing an internal arrangement of a PC card according to a second embodiment of the present invention.

A description is made hereinbelow of a second embodiment of the present invention in conjunction with FIG. 3 showing an internal arrangement of a PC card according to a second embodiment of the present invention. The feature of this PC card, designated at numeral 120, is to detect the voltages of both the main battery 1 and the auxiliary battery 4 by using a power supply switching/battery voltage detecting circuit 8a, and is that the switching between the voltage detection of the main battery 1 and the voltage detection of the auxiliary battery 1 is made in accordance with a selection signal 19a which is the same as the selection signal 19 from the address decode circuit 14a in the foregoing first embodiment.

Figure 4:
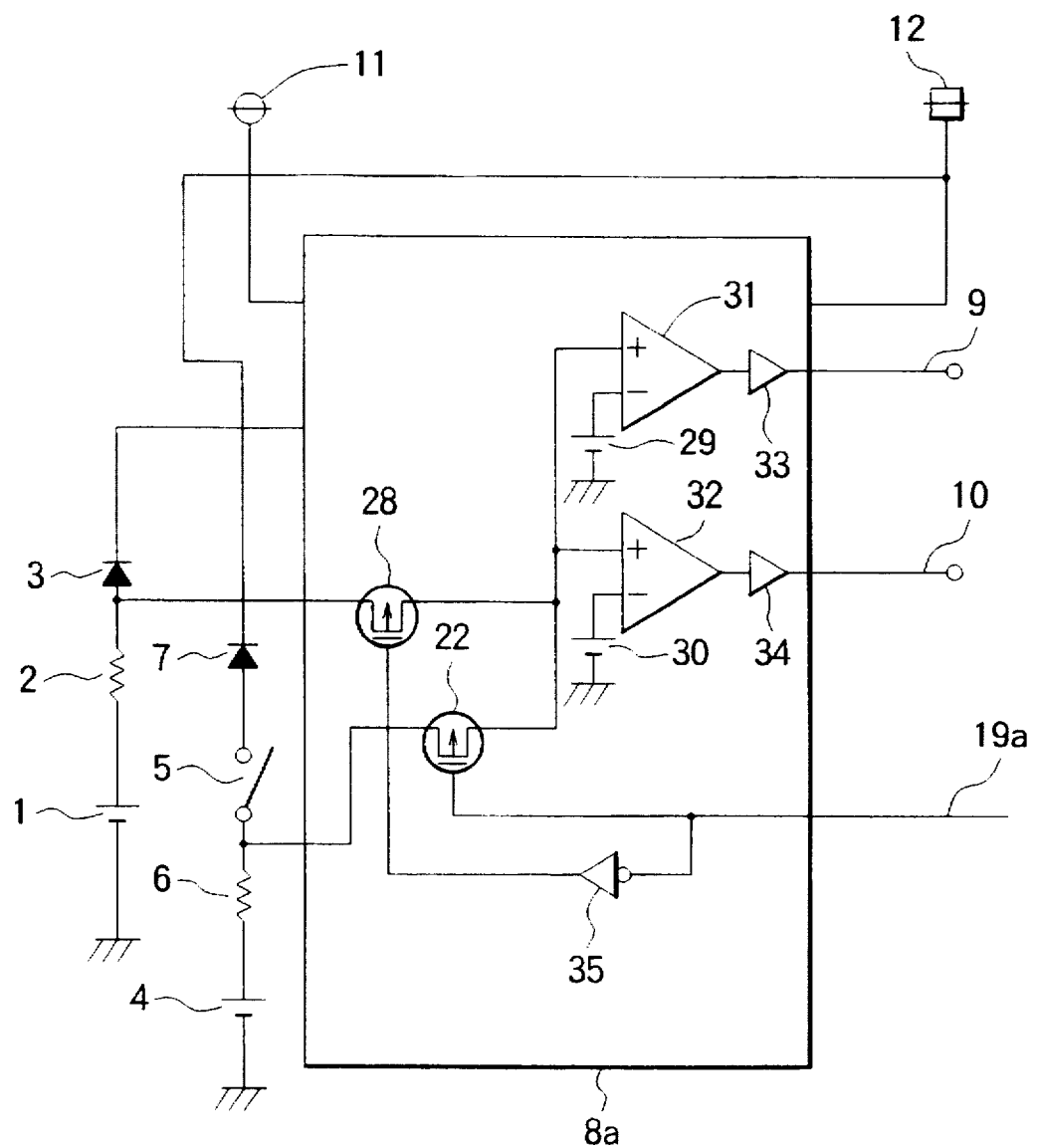
FIG. 4 is a circuit diagram showing one example of a battery voltage detecting section of a power supply switching/battery voltage detecting circuit of FIG. 3.

FIG. 4 is a circuit diagram showing one example of a battery voltage detecting section of the power supply switching/battery voltage detecting circuit 8a. In FIG. 4, designated by reference numerals 22 and 28 are P-channel MOSFET transistors, one of which is turned on by an inverter 35 in accordance with the level of the selection signal 19a. MOSFET transistors are utilized because they permit current flow only in the access condition so as to reduce the consumption of the battery. The power supply switching/battery voltage detecting circuit 8a further includes a comparator 31 connected with a 2.6V reference voltage source 29 for outputting an H level signal when the battery voltage is above 2.6V, a comparator 32 connected with a 2.4V reference voltage source 30 for outputting an H level signal when the battery voltage is over 2.4V, and buffers 33, 34 coupled to the output sides of these comparators 31, 32, respectively. The comparators 31, 32 and the buffers 33, 34 are for the voltage detection of the main battery 1 in the prior art, while in this embodiment the MOSFET transistors 22, 28, the inverter 35, and the selection signal conductor 19a are additionally provided for the switching of the battery being connected to the comparators.

The data storage element 13a, and the attribute information storage element 13b comprise the memory means, the address decode circuit 14a comprises the address decode means, the comparators 31, 32 of the power supply switching/battery voltage detecting circuit 8a comprise the battery voltage detecting means, and the MOSFET transistors 22, 28, the inverter 35 and the selection signal conductor 19a of the power supply switching/battery voltage detecting circuit 8a serve as the switching means.

Secondly, a description will be made in terms of the operation of the second embodiment of the PC card. The of the address decode circuit 14a is basically the same as that in the aforementioned first embodiment. If the attribute information memory space selection signal 15 is set to the L level and a given unused considerably-high-order address (see FIG. 2) is specified through the address bus 16, the address decode circuit 14a changes the selection signal 19a into the L level. Thus, the MOSFET transistor 22 inputs or receives, through its gate, an L level signal and then turns on, while the MOSFET transistor 28 inputs, at its gate, an H level signal by means of the inverter 35 and hence turns off. Accordingly, the voltage of the auxiliary battery 4 is input in the comparators 31, 32 so that the voltage state of the auxiliary battery 4 is output to the battery voltage output terminals 9, 10, which allows the voltage state of the auxiliary battery 4 to be confirmable from the outside of the card 120.

Accessing an address other than the given address, the selection signal 19a comes into the H level, with the result that the MOSFET transistor 22 turns off and the MOSFET transistor 28 on. Whereupon, the voltage of the main battery 1 is input in the comparators 31, 32 so that the voltage state of the main battery 1 is output to the battery voltage output terminals 9, 10. Each of the battery voltage output terminals 9, 10 issues the H level, for example, when the voltage of the main battery 1 or the auxiliary battery 4 exceeds 2.6V, while, in the range of 2.6V to 2.4V, the terminal 9 outputs the L level and the terminal 10 outputs the H level. In addition, when the voltage is below 2.4V, both the terminals 9, 10 output the L levels, respectively.

Although in the foregoing first and second embodiments a considerably high order address in the attribute information memory area is used as a given address in the unused memory area for the detection of the voltage of the auxiliary battery, this invention is not limited to this, but can use an address in any area as long as it is not ordinarily accessed. In this case, the address decode circuit 14a will set the selection signal conductor 19 or 19a in the significant condition accordingly.

In one aspect of the present invention, since as described above the auxiliary battery is connected with the battery voltage detecting means to detect the battery voltage under the condition of access to a give address in the unused memory area, the voltage of the auxiliary battery is confirmable from a position external to the PC card, accordingly the PC card can have a high reliability.

In addition, in another aspect of the present invention, the switch means is driven by a signal from the address decode means when a given address in the unused memory area is accessed in accordance with an address signal, with the result that the auxiliary battery comes into connection with the auxiliary battery voltage detecting means to accomplish the detection of the battery voltage. The detection results are temporarily stored in the register means and output as a portion of data to the device. Thus, the voltage state of the auxiliary battery is confirmable in a state in which the interface of the PC card is maintained. In addition, the embodiments employ the circuit arrangement whereby current flows only at the accessing time, thus providing a PC card capable of maximizing the reduction of the consumption of the auxiliary battery for the voltage detection.

Moreover, in a further aspect of the present invention, the voltage of the auxiliary battery is made to be detectable by using the prior battery voltage detecting the means for detecting voltage of the main battery and outputting the detection result to the external device. Ordinarily, the main battery is in connection with the battery voltage detecting means, while the switch means is driven by a signal from the address decode circuit when a given address in the unused memory area is accessed in accordance with an address signal, so that, in place of the main battery, the auxiliary battery comes into connection with the battery voltage detecting means so as to detect the voltage of the auxiliary battery. With this arrangement, the Voltage state of the auxiliary battery is confirmable while maintaining the interface of the PC card, and because of effectively using an existing power supply switching/battery voltage detecting circuit, the detection of the auxiliary battery is possible without adding many parts, thus providing a PC card with the aforementioned effects at a low cost.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A PC card comprising:

a main battery for supplying power to a volatile memory to maintain data stored in the volatile memory;

an auxiliary battery for supplying power to the volatile memory when said main battery is in a non-operating state; and auxiliary battery voltage detection means for detecting a voltage of said auxiliary battery and outputting a detection result indicative of the voltage in response to an external address signal indicative of an ordinarily unaccessed memory area.

2. The PC card according to claim 1, comprising:

memory means including a volatile semiconductor storage element for storing data, the data being maintained by said main battery;

address decode means for accessing an area of said memory means in accordance with an address signal;

switch means driven by said address decode means when said address decode means receives the external address signal to connect said auxiliary battery to said auxiliary battery voltage detecting means; and register means for temporarily storing the detection result and for outputting the detection result as a portion of data to an external device.

3. A PC card comprising:

memory means including a volatile semiconductor storage element for storing data;

a main battery for supplying power to said volatile semiconductor storage element to maintain data stored in said volatile semiconductor storage element;

an auxiliary battery for supplying power to the volatile semiconductor storage element when said main battery is in a non-operating state;

address decode means for accessing an area of said memory means in accordance with an address signal;

battery voltage detecting means for detecting voltages of said main battery and of said auxiliary battery for outputting detection results indicative of the voltages to an external device; and switch means coupled to said address decode means for connecting said auxiliary battery to said battery voltage detecting means when said address decode means receives a first address signal indicative of an ordinarily unaccessed memory area in said memory means, and for connecting said main battery to said battery voltage detecting means when the address decode means receives a second address signal different from the first address signal.

* * * * *